Nov. 8, 1932. G. F. BEHRINGER 1,887,448
CONTAINER
Filed April 24, 1929
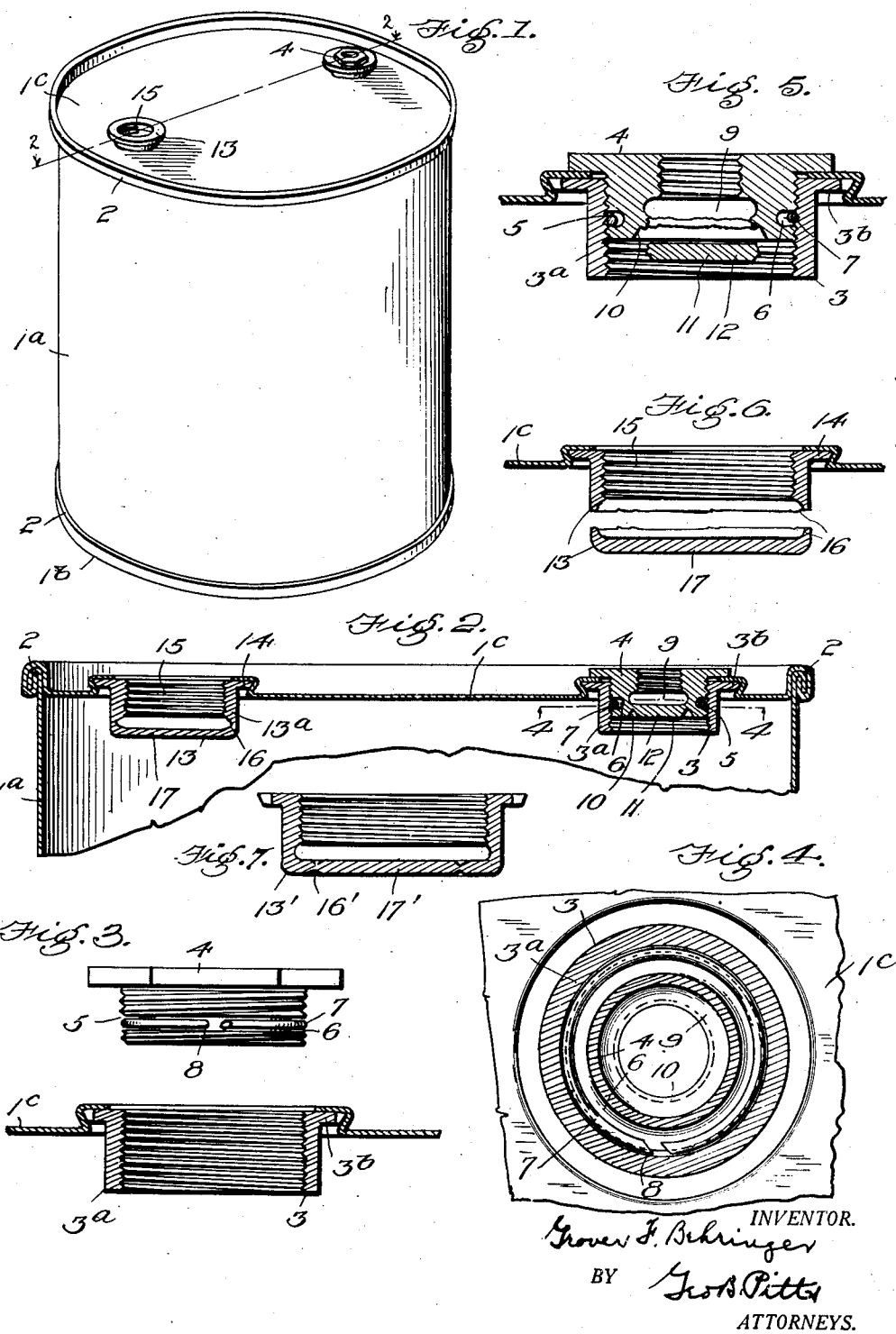
INVENTOR.
Grover F. Behringer
BY Geo. S. Pitty
ATTORNEYS.

Patented Nov. 8, 1932

1,887,448

UNITED STATES PATENT OFFICE

GROVER F. BEHRINGER, OF DEFIANCE, OHIO, ASSIGNOR TO THE AMERICAN STEEL PACKAGE COMPANY, OF DEFIANCE, OHIO, A CORPORATION OF OHIO

CONTAINER

Application filed April 24, 1929. Serial No. 357,673.

This invention relates to containers for materials, such as liquids and semi-liquids, more particularly a container which may be readily filled and sealed in such manner that withdrawal or discharge of the material or any part thereof can only be effected by damaging or mutilating some portion of the container, so that the latter cannot be tampered with, its contents altered or removed during transportation, nor can the container be returned to its original condition and appearance and re-used for shipment of similar material. Due to the fact that opening or emptying of the container in whole or in part, can only be accompanied by damaging some part of its walls, the container is capable of use in the transportation of liquids the nature of which makes it desirable or imperative for the container to be sealed so as to insure that the liquid contained therein shall reach its destination of shipment in its original condition.

One object of the invention is to provide a container with an improved filling bung and closure plug therefor having between them locking elements arranged to prevent removal of the plug, when once positioned, without damaging the bung structure to such an extent as to render the container unserviceable even by the substitution and insertion of a new plug.

Another object of the invention is to provide an improved container in which are provided filling and discharge elements, the former being automatically locked when the container is once filled and the latter being mutilatable to permit emptying of the container, but which elements are so constructed that the container may be used for storage, dispensing and other purposes.

Another object of the invention is to provide a container having a sealable filling opening and a bung having a knock-out or breakable section, the bung being capable of receiving an element to prevent removal of the container contents when the section is removed.

Another object of the invention is to provide a bung and mounting therefor so constructed that a knock-out or breakable section closes the lower end of the bung, Another object of the invention is to provide a container having two openings each mounting a bung, one bung having a sealable plug and the other having removable means to close its opening.

Other objects of the invention will be apparent to those skilled in the art to which my invention relates from the following description taken in connection with the accompanying drawing, wherein Fig. 1 is a perspective view of a container embodying my invention.

Fig. 2 is a fragmentary section on the line 2—2 of Fig. 1.

Fig. 3 is a fragmentary section partly on the line 2—2 of Fig. 1, but showing the plug for the filling opening in elevation ready to be inserted in the filling bung.

Fig. 4 is a section on the line 4—4 of Fig. 2.

Fig. 5 is a fragmentary section similar to Fig. 3, but showing the knock-out section of the plug broken out to provide a vent.

Fig. 6 is a fragmentary section partly on the line 2—2 of Fig. 1, but showing the knock-out section of the discharge bung member broken out.

Fig. 7 is a section of a bung member having a knock-out or breakable section of slightly different construction.

In the drawing, 1 indicates a container of any suitable construction and of any desired shape and size. The container shown by way of example consists of a cylindrical body 1a and heads 1b, 1c. Where these parts are formed of sheet metal, as shown in the drawing, the heads 1b, 1c, are preferably seamed to the body by a double seam 2, as shown in Fig. 2.

The devices for filling and emptying the container 1 may be mounted in any desired location, that is, in the body 1a or upon either head. I prefer to mount these devices in one of the heads, conveniently termed the upper head 1c.

The filling device comprises a suitable bung 3, a closing plug 4 for the bung and elements 5 interposed between them for automatically locking the plug against removal when positioned in the bung. I prefer to use a filling device in which the bung and plug are of standard construction to facilitate manufacture. For this purpose the bung consists of a neck or body portion 3a, threaded internally, and a flange 3b by means of which the bung is mounted in or secured to the metal wall 1c. The disclosed method of securing the bung to the wall 1c may consist in serrating the periphery of the flange 3b and folding the metal wall around the flange 3b and inwardly toward the neck 3a and also crimping the wall into the spaces between the serrations. The locking elements 5 may be of any desired construction, but those illustrated consist of an annular recess 6 formed in the periphery or side wall of the plug 4 and a section of resilient wire 7 bent into substantially annular or circular shape, its ends being disconnected and slightly separated, and one thereof being cut on the bias to form a sharp free end 8. The section of wire 7 is of such size and shape that it projects in radial directions circumferentially of the plug 4 slightly beyond the recess 6 and in line with the threads of the plug. The wire 7 being resilient, it may be expanded over the threads into the recess 6. The recess is deep enough to permit the wire 7 to be compressed inwardly so that the plug 4 may be screwed into position as shown in Figs. 2 and 5. After the plug 4 is inserted or screwed into the bung 3 far enough to cover the resilient wire 7, the latter expands into frictional engagement with the threads of the bung and the locking end 8 serves to engage these threads should the plug 4 be turned in the reverse direction. The sharp or engaging end 8 is formed on the wire end which is in opposition to the threads on the bung 3 when the plug 4 is unscrewed. Assuming that the plug 4 is rotated clockwise when screwed into position, the left hand end of the wire 7 (as viewed in Fig. 4) is provided with a sharp free end so that if attempt is made to rotate the plug counter-clockwise, the end 8 will, due to the tension of the wire, engage the threads of the bung 3 and be locked against turning. The plug 4 is formed with a recess 9 which extends from its face or flange end inwardly to a point near the inner end of the plug and the inner portion of the recess is preferably enlarged. The inner end of the plug 4 is formed with an annular groove 10, the purpose of which is to weaken the bottom 11 of the recess along a continuous line, so that that portion 12 of the bottom defined by the groove 10 may be knocked out (see Fig. 5) to form an opening through the plug 4. The purpose of this opening is to provide a vent, as will later appear. The side wall of the recess 9 may be threaded to receive a suitable plug (not shown) in the event it becomes desirable to close the opening through the plug 4.

The discharge device comprises a cup-shaped member 13 having a flange 14 around its upper open end. The flange 14 is preferably provided with a serrated periphery and is mounted in and secured to the wall 1c in a manner similar to that used to secure the bung 3 in position; but it will be understood that the flange 14 may be otherwise secured to the wall 1c.

The inner side wall 13a of the closing device 13 is threaded, as shown at 15, for a purpose to be later set forth and below the threads 15 the side wall is reduced in thickness, as shown at 16, to form a weakened annular wall along a continuous line, so that the bottom 17 of the device may be knocked out (as shown in Fig. 6) when it is desired to remove all or a portion of the contents of the container 1. As shown in Fig. 7, the bottom 17 of the discharge device 13', instead of its side wall, may be weakened along a continuous line 16' to define a knock-out portion 17'.

In the fabrication of the container, the discharge member 13 is suitably mounted in a rigid, liquid tight manner in the wall of the container and the bung 3 is similarly mounted in any desired relation to the device 13. In putting the container 1 into use, it is filled through the bung 3 with the liquid to be transported. The plug 4 is then inserted in the bung and screwed into position (see Fig. 2), the wire 7 being compressed until it enters the bung opening after which it will thread the threads of the bung until the plug comes to rest in its tightened position. Due to the fact that the devices 5 lock the plug 4 in position in the bung, the plug cannot be removed, the container emptied and then re-filled. Accordingly, once the container is filled and closed by the plug 4, it may be transported to any desired destination and the consignee assured that its contents are in their original condition. To remove or empty the material from the container the bottom 17 is knocked out and the material poured or otherwise drawn from the container. In knocking out the bottom 17 of the discharge device 13, the container 1 becomes conditioned or damaged to indicate that it is not an original container, so that it cannot be re-used by the consignee or consignor again for shipment of the same or any material which must reach its destination in its original condition.

In the construction of the discharge device 13 I provide the inner side walls thereof with screw threads 15 to receive a threaded member (not shown), for example, the collar of a faucet or pump casing, so that the latter may be mounted in the device 13 and used to remove the contents of the container. To provide for such faucet or pump casing the device 13 may be of any standard size.

Where a vent is found desirable, the wall 12 may be knocked out, as already described.

After the container is emptied of its contents, it may be filled with any suitable material through the opening 9 or the device 13 and used for storing or dispensing such material. Due to the fact that the threaded opening 9 and the wall of the device 13 are or may be conventional or standard, suitable plugs may be inserted therein and the container used for shipping and storing various materials.

It will be understood that where the bung 3 is closed and sealed by mutilatable means which permit discharge of the container contents through this bung, then the bung 13 may be used as a vent; for this latter purpose the wall 17 associated with the bung is broken out.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A container comprising side and end walls, an annular device having a flange secured to one wall of said container and formed internally with screw threads, a closure device threaded into said annular device, and means interposed between the side walls of said annular device and said closure device for automatically locking the latter in position and against turning in the reverse direction, said closure device being formed with a chamber open at its upper end and threaded internally and formed in its bottom portion with a weakened wall to define a section which may be removed.

2. A container having a filling opening and an emptying opening, a closure for said filling opening, means for sealing said closure in said opening against removal, whereby the container may be filled through said filling opening and permanently sealed in closed condition, and an internally threaded annular device mounted in said emptying opening during the fabrication of the container and constituting means normally closing said opening and having a portion capable of being forced out of said device to permit emptying of the container.

3. A container having a wall formed with a pair of spaced apart openings, means for closing and sealing one of said openings, and an internally threaded annular device mounted at one end in said other opening, said device being applied to and incorporated in said wall during the fabrication of the container and having at its opposite end means for normally closing said device, said closing means having a weakened section capable of being detached and removed relative to said device to permit access through said device to said container.

4. A container having a pair of closure means, one comprising a single closing member mounted in one wall of the container and the other comprising lockable means consisting of an outer annular member mounted in one wall of the container, an inner member mounted in said outer member and means between said inner and outer members effective, upon the insertion of said inner member in said outer member, to lock said inner member against removal, said first mentioned member and said inner member having portions adapted to be knocked out to permit access to the container.

5. In container closure construction including walls forming a bung opening, a plug for the bung opening, and means for locking said plug to said walls upon the insertion of the plug in said opening, said plug having an opening threaded internally and a partition normally forming a closure for one end of the opening in the plug but removable by deformation to provide an opening through the plug.

6. In a container closure construction including a sheet metal wall formed with an opening, the marginal portion of said wall around said opening being shaped to provide an annular pocket, means for sealing said opening, said means comprising an annular wall having at its upper end a peripheral outwardly extending portion mounted in and interlocked to the walls of said pocket, said annular wall being internally threaded and depending from said peripheral portion inwardly of the container and having closure means for its opposite end, the central portion of said closure means being mutilatable to permit its removal.

7. A container for shipping materials in sealed condition having a filling opening and an emptying opening a closed non-removable member for said emptying opening, lockable closure means for said filling opening including a plug and a device between the walls of said plug and the wall of the filling opening for locking said plug against removal, said device being effective upon the insertion of said plug and the latter being provided with a flange to prevent access to said device and said member having a portion adapted to be mutilated to provide a vent opening for the container.

8. A container for shipping material in sealed condition having a filling opening, and an emptying opening lockable closure means for said filling opening and a closed member for said emptying opening, said closed member being cup shaped and mounted in one wall of the container during its fabrication and the inner side walls of said member being provided with screw threads and its bottom having a portion adapted to be removed.

9. In a container construction having a sheet metal wall formed with an opening, the marginal portion of the wall surrounding said opening being distended and shaped to form an annular pocket, mutilatable sealing and plug receiving means for said opening applied to and incorporated in said wall during the fabrication of the container, said means having annular and flange portions, the latter being mounted in said pocket to support said means in said opening and the former being provided internally with screw-threads to removably receive a plug and closed at its lower end by a mutilatable wall permitting a section of the wall to be broken out and access through the annular portion into the container.

10. In a container construction having a sheet metal wall formed with an opening, the marginal portion of the wall surrounding said opening being distended and shaped to form an annular pocket, a cup shaped member provided at its open end with a flange fitting in and interlocked to the walls of said pocket to support said member in said opening, the bottom of said member being weakened or scored along a circumferential line to permit the central portion of the bottom to be broken out, and a screw-threaded wall within said member for removably receiving a screw plug.

In testimony whereof, I affix my signature.

GROVER F. BEHRINGER.